June 28, 1949.    J. L. DAUM ET AL    2,474,517
APPARATUS FOR HEATING TIRES
Filed April 17, 1946    3 Sheets-Sheet 1

INVENTOR.
THOMAS P. BACON
ROBERT A. McCLOUD
BY JOHN L. DAUM

George B. White
ATTORNEY

June 28, 1949.  J. L. DAUM ET AL  2,474,517

APPARATUS FOR HEATING TIRES

Filed April 17, 1946  3 Sheets-Sheet 2

INVENTOR.
THOMAS P. BACON
ROBERT A. McCLOUD
JOHN L. DAUM
BY George B White
ATTORNEY June 28, 1949.  J. L. DAUM ET AL  2,474,517
APPARATUS FOR HEATING TIRES
Filed April 17, 1946  3 Sheets-Sheet 3
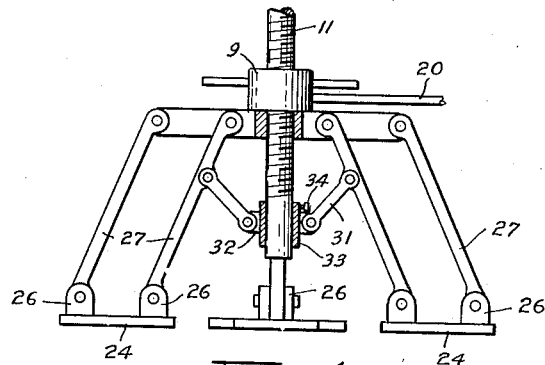
Fig. 4.
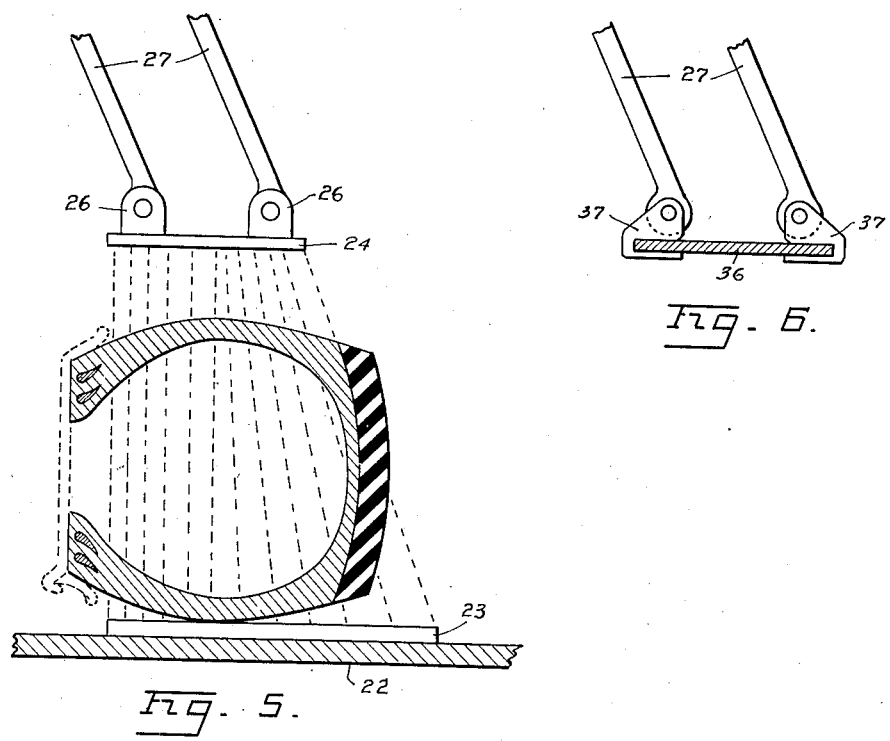
Fig. 5.
Fig. 6.
INVENTOR.
THOMAS P. BACON
ROBERT A. McCLOUD
BY JOHN L. DAUM
George B White
ATTORNEY Patented June 28, 1949

2,474,517

UNITED STATES PATENT OFFICE 2,474,517

APPARATUS FOR HEATING TIRES

John L. Daum, Oakland, and Robert A. McCloud and Thomas P. Bacon, San Leandro, Calif.

Application April 17, 1946, Serial No. 662,696

1 Claim. (Cl. 18—18)

This invention relates to an apparatus for preheating tires before curing and particularly for preheating tires for recapping or retreading operations.

In curing the treads of tires a certain time must usually elapse before the peripheral portion of the carcass is heated to a desired temeperature. Inasmuch as in the usual molds on said pheripheral portion, this portion of the carcass is heated with and through the camelback, the time of curing is prolonged to such an extent that it is apt to overheat the carcass and sometimes overcures the raw rubber or the camelback. In other instances the relative coolness of the carcass causes undercuring of the camelback adjacent the carcass periphery.

An object of this invention is to quickly preheat the carcass of the tire without overheating the new rubber or camelback at the tread of the tires.

Another object of this invention is to accomplish the preheating of the carcass of the tire by dielectric heating.

A further object of the invention is to provide an apparatus whereby the carcass of a tire can be quickly preheated to a desired temperature without heating the new rubber or camelback at the crown or tread of the tire; the preheating is accomplished to bring the carcass temperature up to a safe limit for starting the cure.

Another object of this invention is to provide an apparatus for preheating tires before curing which is highly useful and simple in construction. Convenience of arrangement, lightness and comparative inexpense of manufacture are further objects which have been borne in mind in the production and development of the invention.

The essential features of the invention involved in the carrying out of the objects indicated are susceptible to modification, but a preferred embodiment of the invention is shown in the accompanying drawings, in which:

Fig. 4 is a detail view of a modified form for the adjustable support for the upper capacitor plate sections;

Fig. 5 is a sectional fragmental detail view of our preheating apparatus with adjustable plate sections, and Fig. 6 is a fragmental sectional view of a modified mounting of a non-sectional plate.

Figure 1:
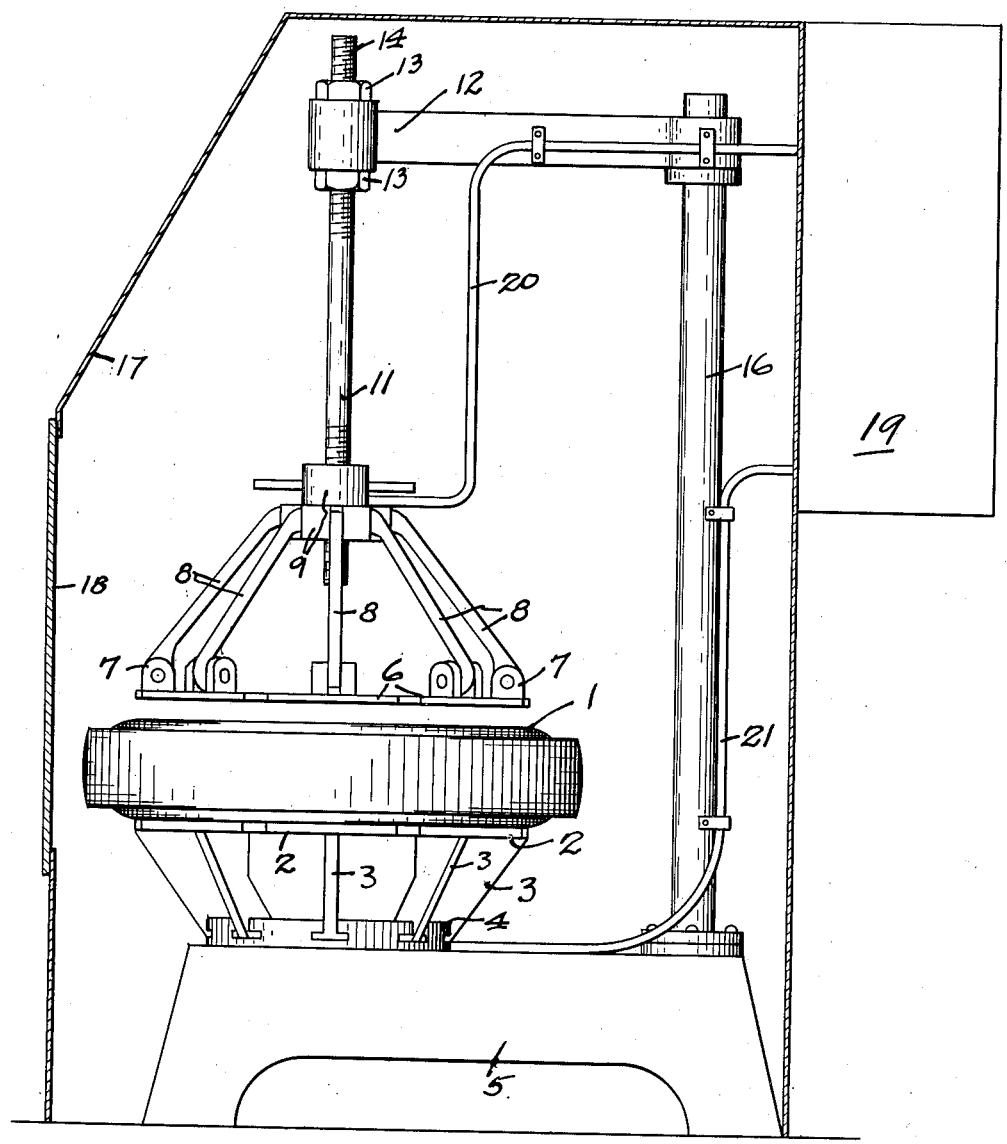
Fig. 1 is a side view of a preheating apparatus for embodying our invention.
Figure 2:
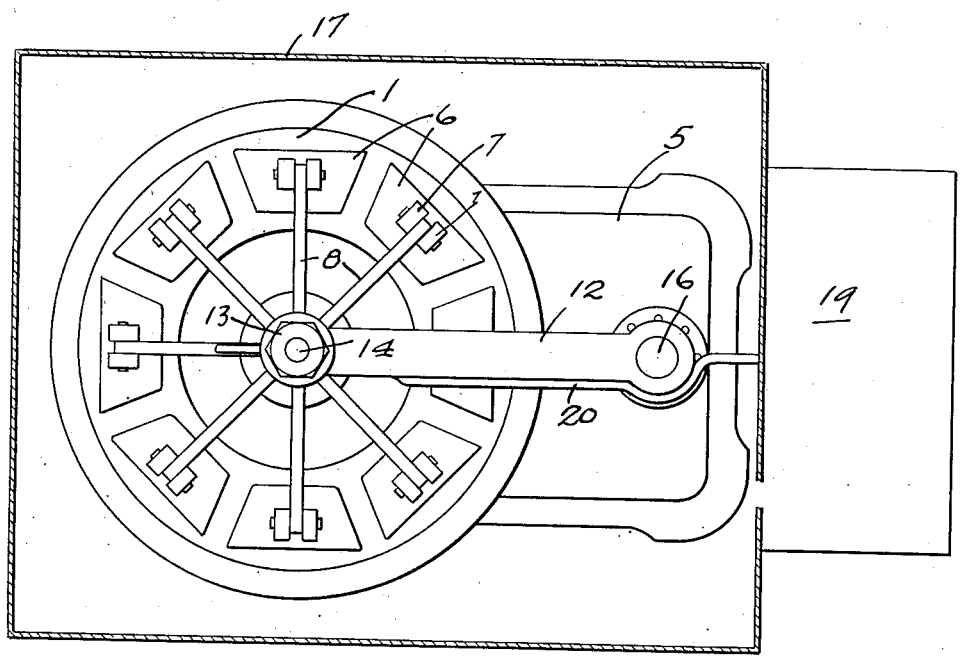
Fig. 2 is a top plan view of said apparatus.
Figure 3:
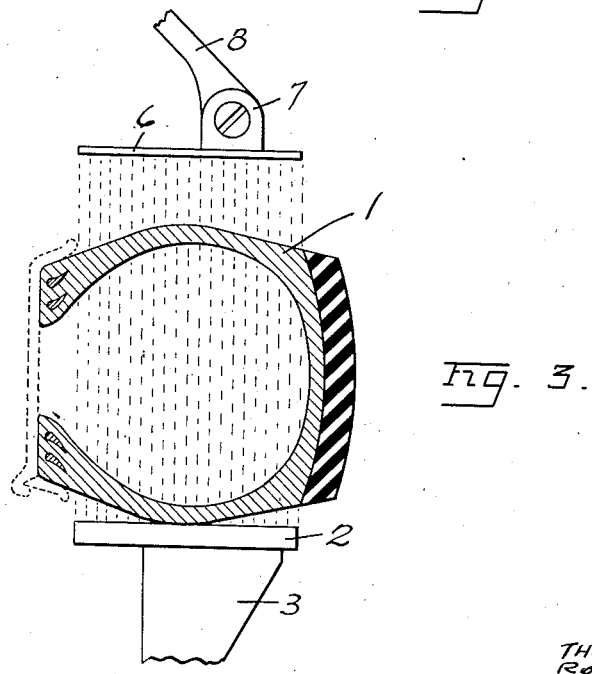
Fig. 3 is a diagrammatic view of the performance of the method of our invention.

In recapping and retreading tires usually the crown of the tire is first rasped or otherwise roughened and a strip of semi-cured or raw rubber called camelback is placed upon the periphery or crown of the carcass. The prepared tire is then placed in a curing mold wherein it is subjected to heat for a perdetermined period of time during which the camelback is cured and vulcanized to the carcass of the tire. Before the actual curing or vulcanizing can be completed that portion of the carcass immediately adjacent to the camelback must be heated to the vulcanizing temperature. There are very definite limits at which the junction between the camelback and the tire reaches the minimum curing temperature. For instance, experiments show that at 230° F. it takes seventy minutes for starting the cure at the junction. The range of safe handling at that temperature, however, is only about thirty-five minutes. Consequently, many failures of recapped or retreaded tires are due to the over heating during the curing operation for an unduly long period. If the curing time is reduced then the danger is the undercuring of the camelback or under-vulcanization which may result in separation of the camelback from the carcass of the tire.

Various known methods of treating tires failed to solve this problem. We solved this problem by preheating the carcass of the tire first to a desired starting temperature within a predetermined period of time without correspondingly heating the camelback. Thereafter, the camelback can be cured and efficiently vulcanized to the carcass of the tire.

Dielectric heating or sometimes called electrostatic heating is utilized in my method. The dielectric heating is applied within definite limits, so as to preheat primarily the carcass of the tire without curing the camelback or raw rubber.

Dielectric or electrostatic heating is applied by placing the object to be heated between capacitor plates, which latter are charged by high frequency currents. When these capacitor plates are charged the negative electrons are displaced or attracted a little way toward the positive plate and repelled from the negative plate. When the charges reverse, electrons are displaced in an opposite direction as they move toward the plate which has changed from negative to positive and away from the one which has changed from positive to negative. The electrons are displaced one way and the other during every cycle of alternating potential difference on the plate, which may be hundreds of thousands of times a second. This electron movement in the dielectric produces heating just as does electron movement in a conductor which is carrying electron flow. The higher the frequency the greater is the heating value caused by a given electron displacement.

In our method the tire is first treated for applying a raw or partly cured strip to the crown or tread portion of the tire. Thereafter, the prepared tire is placed between a negative and positive capacitance plates, which plates are connected in a high frequency electronic circuit. The opposed capacitor plates are adjusted and are of such width that they extend only to the sides of the tire carcass without overlapping the newly applied camelback on the crown of the tire. In the present illustration the carcass is resting on one of the plates, and the other plate is spaced above the top side of the carcass so positioned. Then the high frequency circuit is operated so as to cause the flow of electrons between said capacitor plates and through the carcass of the tire. The action of the electrons passing between said plates and into and through said tire casing will very quickly heat the tire to the desired precuring temperature. After a predetermined time which is determined according to the size of the carcass, the carcass is placed into a mold for the curing of the camelback and the vulcanizing of the camelback or new strip of tire upon the crown and tread portions of the carcass. The prolonging of the cure heretofore needed for heating the carcass and the danger of overcuring the carcass or undercuring the camelback is thus obviated.

In the illustrative embodiment of the apparatus for carrying out my invention, a lower plate on which the tire casing 1 rests is formed by a plurality of sections 2 which sections 2 are mounted on brackets 3 which latter are supported on a base ring 4 resting on a stand 5 of the apparatus.

The other plate is also formed of complemental sections opposite to and spaced from the lower plate section 2. The upper plate sections 6 have lugs 7 extended from their upper surfaces where the section 6 are supported on upwardly converging bracket arms 8 mounted on a hub 9 which latter is threaded or otherwise adjustably mounted on a vertical shaft 11.

The vertical shaft 11 is adjustably mounted in a horizontal arm 12 by means of nuts 13 on the threaded end 14 of the said vertical shaft 11. The arm 12 in turn is supported on the top of a post 16 which extends upwardly from the stand 5 and is spaced outwardly from the periphery of the curing plates.

It is preferable that the entire apparatus be enclosed in an insulated casing 17 which has a door 18 through which the tire to be preheated can be inserted between said plate sections, as heretofore described.

On the casing 17, preferably on the outside, and in this illustration on the back wall of the same, is provided the usual electronic high frequency generator or similar device, as indicated by the box 19, for producing the high frequency current. Many various types of such electronic high frequency devices may be used, and therefore the electrical circuit of the same is not herein shown. A conductor conduit 20 extends from the high frequency device along the top arm 12 and then downwardly to the hub 9. The hub 9 and the arms 8 are of conductor material, or suitable connections for wires may be supplied along the same, to conduct the electric current to the top plate sections 6.

Another conductor 21 is extended from the electronic generator 19 along the post 16 and to the base ring 4, from which either through the brackets 3 or through other suitable conductors the connection is made to the respective lower plate sections 2. The electric circuit may be turned on or off at will by any suitable switch or circuit control device not herein shown.

In the embodiments shown in Figs. 4 and 5, the sections of the plates are adjustable to various circumferential spacings and diameters to accommodate tires of various sizes. In this form the sections of the respective plates may overlap one another at adjacent edges so as to form a continuous surface of variable diameter. On a base plate 22 are directly supported lower plate sections 23 which latter are slidable radially to form a ring or plate of a selected diameter to conform to the size of the tire. Each of the upper plate sections 24 has thereon a pair of bearing lugs 26 in which are pivoted the lower ends of supporting links 27. The upper ends of the supporting links 27 are pivoted at 28 on a flange 29 on the hub 9. From each link 27 closer to the shaft 11 extends inwardly and downwardly a control link 31. Each control link 31 is pivoted at its outer end to a link 27 and its inner end on ears 32 extending from a sleeve 33. The sleeve 33 is slidable on a lower extension of the shaft 11 and is secured in any adjusted position in any suitable manner, such as by a set screw 34. In order to adjust the diameter of the upper plate of this construction the set screw 34 is loosened and the sleeve 33 is shifted on the shaft 11 up or down to respectively position the links 27 outwardly or pull them inwardly for enlarging or reducing the diameter of the upper plate as desired. It is to be noted that by the arrangement of the lower plate sections 23 the field of electronic heating can be also controlled more accurately. By shifting the lower plate sections 23 outwardly the field may be caused to overlap further to the area of junction between the camelback and the carcass of the tire.

Another modified form is indicated in Fig. 6. In this form a solid ring like plate 36 is supported by suitable peripheral clips 37 on the links 27 which latter are pivoted on the flange 29, as heretofore described. However, in this form the inner links 27 and their adjustment structure is not needed. In combination with this solid capacitor plate 36, a lower solid capacitor plate may be used, or the adjustable capacitor plate 23 heretofore described may be utilized. The solid capacitor plates can be easily replaced and interchanged with other plates of different diameter to suit the size of the tire.

In operation the tire carcass 1 is provided suitably with the camelback tread or crown indicated at 22. The plate sections 2 and 6 are of such diameters that they will overlap only the sides of the carcass 1 without extending over the new tire or camelback 22. The units may be made so as to accommodate tires within a certain range, but the spacing of the section of the plate may be made adjustable in such a way as to extend to a larger diameter or be contracted to a smaller diameter to suit the size of the tire precured or preheated in the apparatus. A certain amount of heat will be transmitted from the carcass 1 to the inner portion of the new rubber strip or camelback 22, but that heat is applied at the point of fusion or vulcanization and it will be assistance in accelerating the ultimate vulcanizing of the new rubber upon the periphery of the tire casing 1.

This preheating of the casing may be accomplished before many types of curing operations, it will eliminate the dangers of overheating the carcass or undercuring the new rubber, and will also reduce the time and effort necessary for recapping or retreading tires.

The herein described method and apparatus preheats the tire casing or carcass without heating the raw unvulcanized rubber or camelback. This is essential since the raw rubber of the camelback will start to vulcanize, depending on the composition of it, at about 240° F. The purpose of preheating the tire casing or carcass is to reduce the curing cycle in the tire recapping or retreading mold. The heat supplied for instance, by a usual recapping mold to vulcanize the raw rubber of the camelback comes from the outer periphery and heats the casing through the camelback. Since the critical area in successful capping or retreading is the area of adhesion between the new tread and the tire carcass, it is absolutely essential that the junction be heated long enough to cure the raw rubber at that area. The heating of the tire carcass dissipates heat from the interface between the camelback and the crown of the carcass.

In testing the actual effect of the heat loss due to the heating of the tire carcass through the camelback, it was found that the weight of the tire is determinative of the curing time with the methods in general use in the past. This causes variation and determination of the curing time for tires of various weights. For example, a tire which was 8 ply in thickness and construction took 160 minutes curing time, while a tire with 20 plies took 225 minutes to obtain the equivalent cure at the junction between the camelback and the tire. By preheating both carcasses to the same temperature in accordance with the invention herein described, the same curing time can be employed with both operations irrespective of the weight or ply of the respective carcasses, and said curing time is also generally shortened, as compared with the curing time by prior methods.

In addition the herein described invention saves time by reason of the reducing of the heat losses, which in past methods average for most tire sizes about five minutes for each ply. The heat induced in the tire carcass by our method is conducted to the raw rubber and supplies a portion of the heat required to raise the rubber to the vulcanizing temperatures at the junction area. This will result in a better vulcanized joint between the camelback and the crown of the tire carcass.

Another factor that was taken into consideration in this invention is that the confining of the preheating to the tire carcass accelerates the actual time for retreading or recapping operations. The camelback rises in temperature quickly and requires a very careful handling to prevent precuring of the camelback before the actual molding or vulcanizing to the tire carcass takes place. This critical operation is entirely obviated in applicants' invention where the tire carcass is preheated so as to receive a proper temperature which heats the joining area of the camelback and thereby accomplishes a better union in a comparatively shorter time.

We claim:

In an apparatus for electronically heating a tire carcass, a pair of capacitor plates connected to a high frequency electronic circuit, said plates being adapted to overlap the respective sides of the carcass of a tire therebetween, each of said plates being made of a plurality of segments circumferentially spaced and forming a substantially ring-like area opposite the adjacent sides of said carcass, a frame to support the sections of one of said plates, connecting elements extended from each of said sections to said frame and adjustably connected to the same for radially adjusting the position of each of said sections with respect to the center of the plate, said first plate and said elements being adapted to support a tire thereon, an adjustable frame for the other plate, a supporting element on said frame, a plurality of arms extended from said supporting element radially outwardly and toward said carcass, said sections being pivotally suspended on the ends of the respective arms, and means on said frame engageable with said supporting element and said arms to raise or lower said arms for radial adjustment of said segments of said plates.

JOHN L. DAUM.
ROBERT A. McCLOUD.
THOMAS P. BACON.

REFERENCES CITED

The following references are of record in the file of this patent:

UNITED STATES PATENTS

| Number | Name | Date |
|---|---|---|
| 1,394,928 | Midgley et al. | Oct. 25, 1921 |
| 2,280,771 | Dufour et al. | Apr. 28, 1942 |
| 2,321,131 | Crandell | June 8, 1943 |
| 2,335,878 | Oren | Dec. 7, 1943 |
| 2,339,607 | Smith | Jan. 18, 1944 |
| 2,370,624 | Gillespie | Mar. 6, 1945 |
| 2,421,097 | Lakso | May 27, 1947 |